United States Patent Office 2,771,344
Patented Nov. 20, 1956

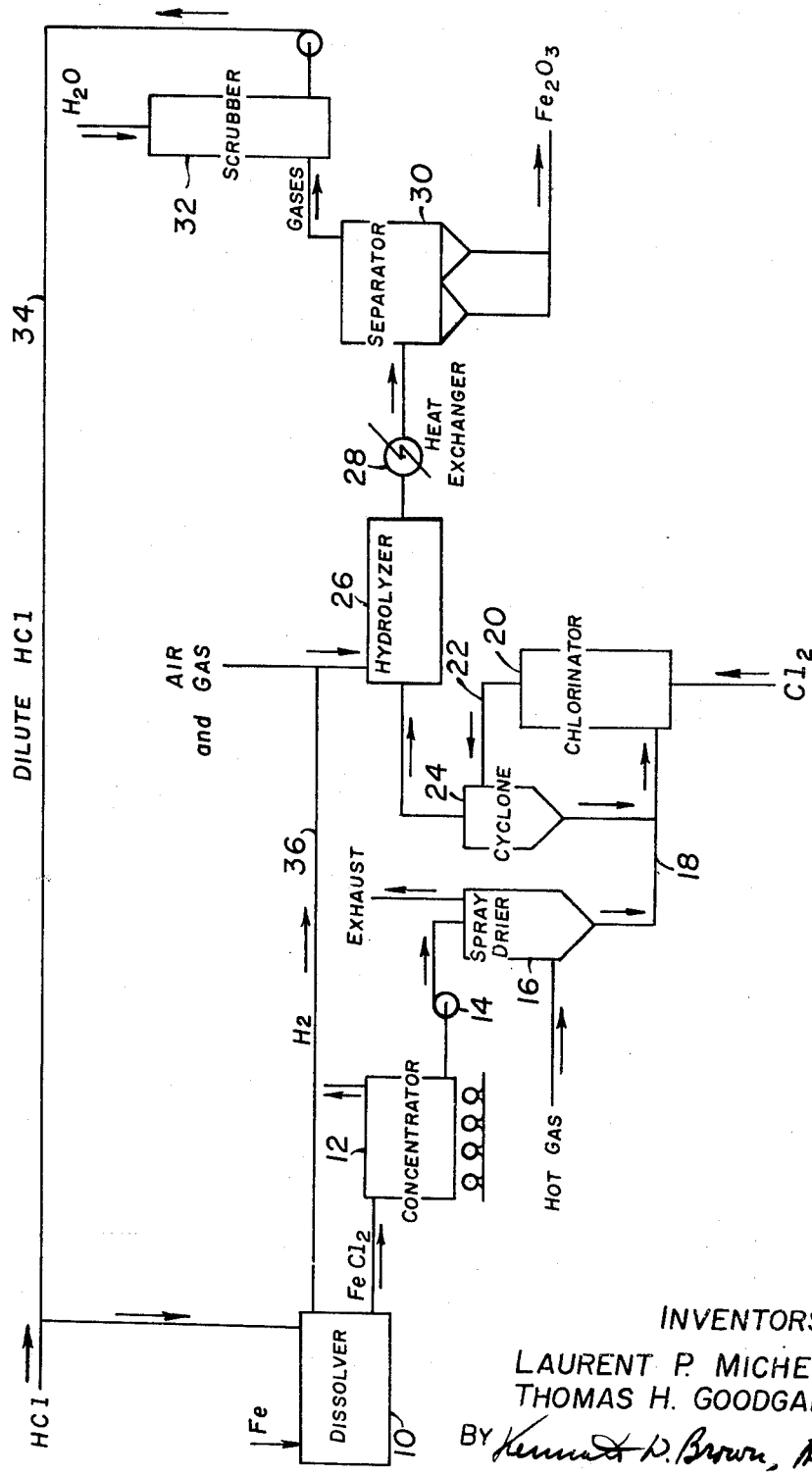

2,771,344

MANUFACTURE OF IRON OXIDE PIGMENT

Laurent P. Michel, Watertown, and Thomas H. Goodgame, Ipswich, Mass., assignors to Godfrey L. Cabot, Inc., Boston, Mass., a corporation of Massachusetts Application August 5, 1954, Serial No. 448,019

9 Claims. (Cl. 23—200)

This invention relates to a method of producing finely-divided iron oxide pigment of exceptionally high purity and surface activity. More particularly our invention is directed to an especially economical and partical process for making an ultra-fine metal oxide as the product of a vapor phase reaction.

Synthetic iron oxide pigments have previously been manufactured either by precipitating a hydrated form from aqueous solution of an iron salt followed by roasting of the precipitate to the desired degree, or by thermal decomposition of an iron salt such as copperas $$(FeSO_4 \cdot 7HS_2O)$$

(see for example U. S. Patent 2,184,728 to Fireman), or by roasting a metal salt in the presence of oxygen. Such pigments as thus produced do not have the requisite high purity, surface activity and ultra-fine particle size for use as filters in elastomers and plastics.

Processes are known by which filler grade iron oxides can be produced but such processes are relatively very expensive to operate. For that reason, although iron oxide is an exceptionally good reinforcing filler for certain elastomeric materials, notably butyl and polyester rubbers and certain plastics, cheaper and inferior fillers have had to be used instead. It is the principal object of this invention to provide a process for the production of high quality, filler grade iron oxide at a cost no greater than that prevailing for the production of other fillers heretofore generally used.

It is a further object of this invention to provide a novel process for the production of finely divided iron oxide of high purity and surface activity having outstanding reinforcing qualities in butyl rubber, polyesters and other elastomers and polymers.

Another object is to provide a highly practical and integrated process for making iron oxide as a product of a vapor phase reaction, which process involves economizing steps unique in the field of preparing metal oxides by means of vapor phase reactions.

Another object is the production of iron oxide of increased surface area, activity and chemical purity and having greater uniformity of color, particle size, bulk density and other physical properties.

Other objects and advantages of this invention will be apparent from the detailed description and discussion which follow.

The process of our invention consists in a novel series of steps by which ordinary scrap or other cheap and available form of iron can be readily converted to valuable pigment grade iron oxide. Briefly stated these steps comprise dissolving metallic iron in dilute hydrochloric acid, thereby converting the iron to ferrous chloride ($FeCl_2$) solution, evaporating the water from the solution, contacting the resulting dry ferrous chloride particles with chlorine gas to obtain ferric chloride ($FeCl_3$) vapors, hydrolyzing these vapors in water vapor at elevated temperatures and recovering the finely divided solid oxide thus formed as product.

The reactions involved in the process of this invention can be illustrated by the following equations:

(1) $2Fe + 4HCl(aq.) \rightarrow 2FeCl_2 + 2H_2(g)$
(2) $2FeCl_2 + Cl_2(g) \rightarrow 2FeCl_3(g)$
(3) $2FeCl_3(g) + 3H_2O(g) \rightarrow Fe_2O_3 + 6HCl(g)$ The overall reaction can therefore be represented by the following summary equation:

$2Fe + Cl_2(g) + 3H_2O(g) \rightarrow Fe_2O_3 + 2H_2(g) + 2HCl(g)$

This summary equation reveals the very low chlorine consumption of only 1 mol per mol of oxide produced and also the fact that hydrogen and extra HCl are both by-products of the net reaction. An outstanding advantage of the present process lies in the simplicity with which the recovery and utilization of by-product HCl may be effected. The presence of a net surplus of HCl aids in this attainment. The present invention also contemplates the possibility of saving on fuel costs through use of the by-product hydrogen from the iron dissolution step to satisfy part of the fuel requirements of the process. For example, such hydrogen can be burned to supply heat for the process or to form a part of the high temperature water vapor required in the hydrolysis reaction. There are a number of ways in which the said high temperature water vapor may be supplied in the present process. Thus, it may be provided in the flame produced by burning a mixture of gases which form water as one of the products of their combustion. Such a mixture would necessarily include at least one hydrogen-containing gas such as hydrogen, methane or other hydrocarbon, ammonia or any gas containing free or combined hydrogen and at least one oxygen-containing gas such as oxygen or air. Preferably, the said mixture should be free of elements other than H, C, O, N, and Cl and the oxygen component should be supplied to the hydrolysis flame in excess of the amount required for complete combustion of all the C and H present. Alternatively, the high temperature water vapor may be supplied as the hot combustion products of a separately conducted reaction in which a hydrogen-containing gas is burned in an oxygen-containing gas. A third procedure would be to supply high temperature steam from a high pressure water boiler or flash pot heated to the desired degree by any convenient means.

The details of the process of our invention can best be explained and understood from the following description of a specific embodiment showing one of the preferred ways of putting it into practice. This particular embodiment is illustrated by the accompanying drawing which is a flow sheet of the various related processing steps.

Metallic iron, preferably finely subdivided for rapid reaction, is fed to dissolving tank 10 where it is reacted with dilute hydrochloric acid of about 3–25% by weight concentration. The iron goes into solution as ferrous chloride with formation of hydrogen gas. The ferrous chloride solution consisting of about 4–40% $FeCl_2$ and some unreacted HCl then flows into concentrator 12 of conventional design where a portion of the water is evaporated from the solution. This concentrator is optional equipment and may be omitted if desired. From concentrator 12, or directly from dissolver 10 if the concentrator is omitted from the system, the ferrous chloride solution is delivered by means of pump 14 to spray drier 16 in which it is contacted with hot gases in accordance with conventional procedures. There the remaining water is substantially completely evaporated from the solution leaving small solid crystals of ferrous chloride. These drop out of the drier into gas transport conduit 18 and are carried in a stream of hot gas into chlorinator 20.

There the ferrous chloride is converted to the gaseous ferric chloride which is conducted through conduit 22 and cyclone separator 24 into hydrolyzer 26. Unreacted ferrous chloride is withdrawn from the bottom of cyclone 24 and returned to chlorinator 20 through conduit 18. Chlorine gas is supplied to the chlorinator through pipe 28.

It will be appreciated that some variation in the arrangement of apparatus is possible. Thus it will ordinarily be desirable to employ two dissolving tanks 10 as the initial reaction must necessarily be carried out in batches. Thus as the ferrous chloride solution is being withdrawn from one tank fresh iron is undergoing reaction in the second.

Another possible modification is in the means for conveying the ferrous chloride into the chlorinator so that the chlorine gas may be employed as the carrier. The chlorinator itself is preferably a jiggler in which the $FeCl_2$ is maintained as a fluid bed by the incoming streams of chlorine and carrier gas, if any. The operation of fluid systems is well known and requires no further description. Alternatively, chlorinator 20 may be a rotary drum or other convenient type of apparatus.

The ferric chloride discharged as a vapor from the chlorinator is first passed through a cyclone or other convenient type of separator 24 where entrained unreacted ferrous chloride is removed for recycle to the chlorinator and thence into one end of an elongated reaction chamber or hydrolyzer 26. There it is intimately mixed with hot water vapors which may be superheated steam or preferably hot products of combustion of a gas which forms water vapor on burning. The hydrolysis step may advantageously be carried out in a manner similar to that described in copending application, Ser. No. 129,089 of Stokes & Kistiakowsky. In this step the ferric chloride is hydrolyzed to ferric oxide ($Fe_2O_3$) and hydrogen chloride which, as an aerosol, is conducted through heat exchanger 28 (optional) to a suitable separator 30. In the separator, which may be a plurality of cyclones or a bag or ceramic filter, the iron oxide is recovered as product and the hydrogen chloride is conducted to scrubber 32 wherein dilute hydrochloric acid is produced by scrubbing the gas with water. The dilute HCl may then be returned to the dissolving tank 10 for reaction with fresh iron.

A further feature of this invention is to recover the hydrogen produced in the ferrous chloride production step and conduct it to hydrolyzer 26. There it may be burned in air or oxygen according to the Stokes & Kistiakowsky process mentioned above to provide the necessary water vapor for the hydrolysis reaction.

The operating conditions for the process of this invention are generally as follows. The ferrous chloride solution produced in dissolving tank 10 will contain about 4–40% $FeCl_2$. Under conditions such that the solution is highly dilute it is desirable to concentrate it to a $FeCl_2$ content of at least about 10% and preferably to the point just before which solid crystals commence to form, or about 40–50%. The solution is then delivered to the spray drier 16 as a finely atomized spray so that as the water is evaporated the solid $FeCl_2$ particles are formed in as small a size as possible. These particles are then conveyed to chlorinator 20 either in the hot chlorine treating gas or by other means such as a screw conveyor or a dry inert gas stream.

The temperature maintained in the chlorinator is about 300–600° C. and preferably between 400 and 500°. As the chlorination reaction if started at elevated temperatures is exothermic no supplemental heating of the chlorinator is required. Consequently, if ferrous chloride is delivered to the chlorinator from the drier at 200–400° C. the chlorine gas can be supplied at 300–600° C. Alternatively, the chlorine may be introduced into the reaction in the unheated state but in such case the chlorinator must be heated by other means, as with hot, dry combustion product gases or indirectly.

For the hydrolysis of the ferric chloride it is necessary that the reaction be carried out at a temperature of at least about 500° C. Hence in the practice of our invention we prefer to employ a process of the type described in the above-identified Stokes et al. application although high pressure steam may be flashed into the hydrolyzer at the requisite temperature, or hot combustion product gases produced outside of the reactor may likewise be used. In any event the higher temperatures, about 800–1100° C., are preferred as the hydrolysis reaction proceeds more rapidly at those temperatures.

Regardless of how the water-vapor is supplied to hydrolysis chamber 28, it should be supplied in substantial excess, i. e., at least about 25% in excess of that required to produce ferric oxide by reaction with $FeCl_3$ vapor according to Equation 3 above. Preferably the amount of water vapor made available to the reaction will be 50–100% in excess of the stoichiometric requirement for complete reaction and may be as much as 3–10 times the stoichiometric equivalent requirement, particularly if the reaction temperature is below the preferred range.

The high-temperature hydrolysis reaction in hydrolyzer 26 will produce a gas-borne aerosol of very finely divided solid particles of ferric oxide. For best results, these solid particles should be separated from the by-product gases and vapors quickly and at a temperature at least sufficiently high to avoid condensation of water vapor or HCl, etc. Thus, the separation temperature should be at least as high as 75° C. and preferably about 200° C. or even higher.

Depending somewhat upon the temperature of the aerosol mixture leaving the hydrolysis chamber, it may be advisable to cool same prior to separation of the product oxide. In any case, the tail gas remaining after separation of the solid oxide should be cooled down to about 100° C. before passing to the HCl recovery system.

The hydrogen chloride in the by-product gases can be easily recovered as a dilute hydrochloric acid by absorption in cold water. For example, a single pass through a packed scrubbing tower 32 will produce a solution containing about 3 to 20% by weight HCl. This can be returned directly through conduit 34 to one of the dissolving tanks 10 for reuse without any special treatment whatsoever, thus giving the simplest possible chlorine recovery system applicable to production of a metal oxide by vapor phase hydrolysis reaction. The dilute hydrochloric acid so recovered will be quite warm due to the heat of absorption of HCl in water. Use of the acid while warm will aid the reaction with the iron metal.

The hydrogen given off from the reaction in the dissolvers between the iron metal and the dilute acid may be salvaged and used to supply a part of the fuel requirements of the process, thus effecting further economies. If so used it may be conducted to hydrolyzer 26 through conduit 36.

Obviously, the quickest method of cooling the aerosol mixture from the hydrolysis chamber and/or the by-product gases from the cyclone in which the ferric oxide product is separated is to quench them with a water spray. Alternatively, they can simply be passed through an air-cooled coil. However, it is quite feasible to recover the heat from said reaction products by means of heat exchangers for use in other phases of the process. For example, the dilute ferrous chloride from the dissolver can be employed very efficiently for this purpose by passing it through a heat exchanger in countercurrent flow to first the by-product tail gases from the cyclone or other separator, and secondly to the aerosol mixture from the hydrolysis chamber.

Many other modifications and additions to the process as practiced in the manner schematically illustrated are, of course, possible. Thus, the ferric oxide product can be after-treated in various ways, as for example by roasting to effect variations in color, pH, gas content, etc.

Obviously, the concentrator 12 can be omitted, especially if the concentration of the FeCl₂ in the liquor from the dissolver 10 is already about 20% by weight or higher.

The ferric oxide produced by the process described above is an exceptionally high grade and remarkably active pigment. It is composed of individual discrete particles about 20 to 100 millimicrons in average size, depending somewhat on conditions of formation. The higher the proportion of water vapor and other combustion gases in the hydrolysis reaction, and the higher the hydrolysis temperatures, the finer the particles of Fe₂O₃ formed tend to be. Considerable control over the size, shape and color of the ferric oxide particles is possible, but under any given conditions of operations the product is strikingly uniform in these as in all other properties and characteristics.

The following example illustrates in more detail the operation of the process of our invention to produce a specific product.

Example 100 lbs. of iron filings are added to 3000 lbs. of 5% hydrochloric acid and stirred together in a rubber-lined tank until the iron is completely dissolved. The resulting solution containing about 9% ferrous chloride by weight is then heated to drive off water. Water is evaporated until the volume of the solution has been reduced to about one third its original volume, the ferrous chloride concentration being thus increased to about 25%. This hot (100° C.) concentrated solution is then dried by atomizing it into a countercurrent stream of hot combustion product gases which enter the spray drying chamber at a temperature of about 300° C. The dried ferrous chloride collects in the bottom of the drier in the form of small spherical granules.

These small beads of solid ferrous chloride are very light and free-flowing. While still hot (about 200° C.), they are allowed to flow continuously at a rate of about 1 lb./min. into a stream of hot dry gas. This gas is substantially free of water and is at a temperature of about 600° C. The solid FeCl₂ granules are picked up and suspended in the said gas stream and lifted into an insulated fluidizing tower about 8 inches in diameter. The suspended solid is maintained in said tower in the form of a fluidized bed with the aid of a stream of chlorine gas fed into the bottom thereof at about 100° C. and at a rate of about 25 lbs./hr. Because of the large surface and light- semi-porous nature of the fine particles of ferrous chloride, the chlorination reaction proceeds very rapidly under the influence of the 400° C. temperatures at which the tower is maintained and ferric chloride vapor is continuously produced at the rate of about 75 lbs./hr. and is carried out the top of the tower by the inert gases. The ferric chloride vapor stream leaving the fluidized bed contains about 1 volume of Fe₂Cl₃ vapor to 9 or 10 volumes of inert combustion gases. This stream is cleaned of entrained solids by passage through a cyclone separator and is then fed to a hydrolysis chamber the diameter of which is about 5 inches. The ferric chloride stream enters the hydrolysis chamber axially and is surrounded by a turbulent flame produced by burning natural gas and air introduced tangentially around the inlet stream of ferric chloride. The natural gas and air are fed to the burner continuously at rates of about 500 std. cu. ft./hr. and 8,000 std. cu. ft./hr. respectively, giving a water vapor forming capacity about 4 times that stoichiometrically required for reaction with all the ferric chloride. The gaseous reaction mixture in highly turbulent state and at a temperature of about 1000–1200° C. flows at high velocity out of the elongated hydrolysis chamber after an average residence time of only a second or two. A finely-divided and widely distributed aerosol of ferric oxide forms in the hydrolysis reaction zone almost instantaneously and is recovered immediately by passing the exhaust gases from the hydrolysis chamber through ceramic tube filters.

The by-product tail gases leaving the ceramic filters are passed up through a 1 foot diameter tower containing ceramic packing. Cold water is sprayed in at the top of the tower and flows down through the packing at the rate of about 850 lbs./hour. Most of the HCl and water vapor in the tail gases are scrubbed out producing weak hydrochloric acid of about 5% concentration. This is collected from the bottom of the tower at the rate of about 1000 lbs./hr. and is available for reaction with iron scrap as the first step in making high-grade air-borne ferric oxide by the process just described.

The resulting ferric oxide product is a reddish brown powder with an average particle size of about 40 millimicrons and a specific surface area of about 50 sq. meters per gram, containing less than 1% moisture and less than 1% chlorine. It is characterized by exceptional activity when used as a reinforcing filler in butyl rubber and in cured polyester elastomers or rigid plastics.

Thus, it gives high tensile strength and good abrasion resistance to articles formed from such polymers without interfering in any way with normal curing techniques. For example, it is effective in such uses, either alone or in combination with other less active fillers, at total filler loadings of about 25 to 150% based on the weight of the polymeric material. Obviously, it would be advantageous for use in such articles where reddish or reddish brown colors are suitable or desirable. The high grade ferric oxide produced by the novel process of our invention is also superior as a coloring pigment by virtue of its purity and existence as readily dispersible discrete particles of exceptionally small average diameter.

Having thus described our invention as well as preferred embodiments thereof, what we claim as new and desire to secure by Letters Patent is:

1. A process for producing finely divided iron oxide which comprises reacting metallic iron with dilute hydrochloric acid thereby producing hydrogen gas and an aqueous solution of ferrous chloride, separating the ferrous chloride thus formed as a dry solid from said solution, contacting said ferrous chloride with chlorine gas at elevated temperatures in the absence of water vapor thereby producing ferric chloride in anhydrous vapor form, conducting said anhydrous ferric chloride vapor to a hydrolysis zone and therein intimately and turbulently contacting said ferric chloride vapor with water vapor at elevated temperatures thereby hydrolyzing said ferric chloride to form an aerosol of solid iron oxide particles in a gaseous medium containing by-product hydrogen chloride, and recovering directly from said aerosol a pigment grade iron oxide product having an average particle size of less than 100 millimicrons.

2. The process of claim 1 further characterized by recovering by-product hydrogen chloride in the form of dilute hydrochloric acid and reacting same directly with the metallic iron in the first stage of the process.

3. The process of claim 1 further characterized by conducting the hydrogen produced in the reaction between the iron and hydrochloric acid to the hydrolysis zone and burning the hydrogen therein to form part of the hot water vapor needed for reaction with the ferric chloride vapor.

4. The process of claim 1 in which the ferrous chloride and chlorine gas are preheated to temperatures such that the reaction between them is self-sustaining.

5. The process of claim 1 in which more than sufficient water vapor for theoretically complete conversion of the ferric chloride to ferric oxide is employed.

6. A process for producing finely divided iron oxide of high purity which comprises reacting finely divided metallic iron with dilute hydrochloric acid thereby forming an aqueous solution of ferrous chloride, evaporating the water from the ferrous chloride by atomizing the solution thereof into hot gases thereby producing small particles of solid ferrous chloride, conducting the ferrous chloride particles to a fluidizing zone maintained at a temperature of at least 300° C., fluidizing said particles therein in a dry gas consisting at least in part of chlorine gas thereby producing dry vaporous ferric chloride, conducting the dry ferric chloride vapors to a hydrolyzing zone, reacting said vapors therein with water vapors heated to at least 500° C. thereby producing solid ferric oxide having an average particle size of less than 100 millimicrons and gaseous HCl in the form of an aerosol, separating the solid oxide from the separated gases at a temperature of not less than about 200° C., scrubbing the gases with water, thereby producing dilute hydrochloric acid and cycling the hydrochloric acid to the reaction with fresh metallic iron.

7. The process of claim 6 further characterized by separating unreacted solid ferrous chloride discharged from the fluidizing zone from the vaporous ferric chloride and returning the separated solid material to the fluidizing zone.

8. The process of claim 6 in which hydrolysis of the ferric chloride is effected by reaction with water vapor produced by burning in an oxygen-containing gas a water-producing gas selected from the group consisting of hydrogen, hydrocarbon gas and ammonia.

9. The process of claim 8 in which the hydrolysis of the ferric chloride is conducted under highly turbulent conditions created by the combustion of the water-producing gas in the oxygen-containing gas in a turbulent flame closely surrounding said ferric chloride.

References Cited in the file of this patent
UNITED STATES PATENTS

| | | |
|---|---|---|
| 1,967,235 | Ferkel | July 24, 1934 |
| 1,994,367 | Millar | Mar. 12, 1935 |
| 2,291,206 | Bowes | July 28, 1942 |
| 2,428,221 | Hudson | Sept. 30, 1942 |
| 2,436,870 | Murphree | Mar. 2, 1948 |
| 2,592,580 | Loevenstein | Apr. 15, 1952 |
| 2,621,118 | Cyr et al. | Dec. 9, 1952 |

FOREIGN PATENTS

| | | |
|---|---|---|
| 100,517 | Great Britain | June 1, 1916 |
| 307,190 | Great Britain | Mar. 7, 1929 |
| 701,797 | Great Britain | Jan. 6, 1954 |